Patented Mar. 31, 1936

2,035,566

UNITED STATES PATENT OFFICE 2,035,566

ALUMINUM SOLDER

Benedicto Pace, Cruzeiro, Brazil

No Drawing. Application August 23, 1934, Serial No. 741,185. In Brazil September 14, 1933

1 Claim. (Cl. 75—178)

The present invention relates to a new solder for aluminum consisting of an alloy of two metals, zinc and tin, in the proportions of one and a half parts of zinc to one part of tin.

The zinc used in the solder must be previously prepared in the following manner: 500 grams of zinc are melted with the addition of 5 grams of saltpetre at first and 10 grams of borax afterwards, care being taken to remove the clinker as it comes up to the surface.

150 grams of the zinc thus prepared are melted and 100 grams of tin added and thoroughly stirred till the mixture becomes homogeneous, when 5 grams of rosin are added. As the rosin takes fire coming into contact with the melted alloy, the crucible must be covered to avoid combustion.

Thus prepared the alloy can be poured into moulds, for future use.

The present solder does not require the use of hydrochloric acid; it will be enough to clean the surface to be soldered with a fine file or sandpaper. The soldering process is identical to that of tin soldering, but care should be taken to heat the aluminum surface, that it will take the solder well. This may easily secured by using the heat of the soldering tool.

The present solder may be used in soldering with the oxygen blow pipe as well.

What I claim and desire to secure by United States Letters Patent is:

The process for preparing a bi-metal solder for aluminum, which consists in first melting about 500 grams of zinc and about 5 grams of saltpeter, subsequently adding thereto about 10 grams of borax and removing all clinkers from the melt; second, melting in a covered crucible about 100 grams tin with about 150 grams of said zinc melt while thoroughly stirring until the mixture has become homogeneous and finally adding about 5 grams of rosin, care being taken to avoid combustion.

BENEDICTO PACE.